United States Patent [19]

Barringer et al.

[11] Patent Number: 5,064,867
[45] Date of Patent: Nov. 12, 1991

[54] PRODUCTION OF FOAMED POLYMER STRUCTURES

[75] Inventors: James R. Barringer, Magnolia, Ark.; H. Eugene Broemmelsiek, Baton Rouge, La.; Porter W. Gregory, Magnolia, Ark.; Carroll W. Lanier, Baker, La.; Raymond Lee, Elk Grove Village, Ill.; Harold E. Schulz, Magnolia, Ark.

[73] Assignee: Ethyl Corporation, Richmond, Va.

[21] Appl. No.: 466,096

[22] Filed: Apr. 5, 1990

[51] Int. Cl.$^5$ .................... C08V 9/02; B29C 35/00
[52] U.S. Cl. ...................... 521/50.5; 264/26; 521/183; 521/184; 521/185; 521/189
[58] Field of Search ............ 521/50.5, 183, 184, 521/185, 189; 264/26

[56] References Cited

U.S. PATENT DOCUMENTS

| | | | |
|---|---|---|---|
| Re. 30,213 | 2/1980 | Gagliani et al. | 521/185 |
| 4,153,783 | 5/1979 | Gagliani et al. | 528/337 |
| 4,161,477 | 7/1979 | Long et al. | 260/326 |
| 4,183,838 | 1/1980 | Gagliani | 260/32.6 |
| 4,183,839 | 1/1980 | Gagliani | 260/37 N |
| 4,296,208 | 10/1981 | Gagliani et al. | 521/77 |
| 4,305,786 | 12/1981 | Shultz | 376/254 |
| 4,305,796 | 12/1981 | Gagliani et al. | 204/159 |
| 4,439,281 | 3/1984 | Schneider et al. | 204/2.1 |
| 4,822,537 | 4/1989 | Lanier et al. | 264/26 |
| 4,883,827 | 11/1989 | Ferro | 521/184 |
| 4,897,234 | 1/1990 | Ferro | 521/184 |
| 4,897,432 | 1/1990 | Lee et al. | 521/184 |
| 4,943,598 | 7/1990 | Ferro | 521/184 |
| 4,943,599 | 7/1990 | Ferro | 521/184 |

*Primary Examiner*—Morton Foelak
*Attorney, Agent, or Firm*—Richard J. Hammond

[57] ABSTRACT

Described are ways of improving the yields of specification grade polyimide foam on a consistent basis from one run to the next, by use of improved microwave-based foaming processes. In one such process, prior to the application of the microwave radiation, the body of polyimide precursor is compressed at a pressure that will reduce the bulk volume of the precursor and heated to a temperature below that at which any substantial foaming occurs. to accomplish the foaming, one further embodiment of the invention employs microwave radiation directed upon the top, sides and ends of the body of above-treated polyimide precursor and of the foam structure as it is developing maintaining the developing foam under a substantially vapor-impermeable microwave compatible shroud. The extent to which the microwave radiation impinges upwardly into the bottom of said body and said foam structure is curtailed, preferably by means of a metallic shield located below the precursor and developing foam structure.

29 Claims, 2 Drawing Sheets

PRODUCTION OF FOAMED POLYMER STRUCTURES

TECHNICAL FIELD

This invention relates to the production of cellular polymeric structures, and more particularly to improvements in the manufacture of polyimide foams.

BACKGROUND

Over the years, considerable effort has been devoted to the development of technology for producing polyimide foams. Such materials are generally produced by forming a polyimide precursor, usually an essentially equimolar mixture of a lower alkyl ester of a tetracarboxylic acid and one or more primary diamines, and subjecting a bed or body of this polyimide precursor mixture to a temperature sufficient to cause the development of a foamed polymer structure through the generation and evolution of gaseous material within the body of the precursor. See for example U.S. Pat. Nos. 4,153,783, 4,296,208, 4,305,796, 4,439,281 and Re.30,213. Although the foaming operation may be performed in thermal ovens, to date use of microwaving as described in U.S. Pat. Nos. 4,305,796 and 4,439,381 has proven most successful.

Improvements in the formation of polyimide foams obtained by microwave techniques has been observed by employing, for example, a microwave compatible shroud and or a microwave containing shield. See for example U.S. pat. applications Ser. No. 248,688, filed Sept. 26, 1988 and Ser. No. 209,018 filed June 20, 1988.

Despite the intensity and magnitude of the efforts to improve upon the technology of polyimide foam production, a number of difficulties have defied solution. Chief among these has been the inability to achieve consistently high yields of useable foam from the polyimide precursor. As formed, the polyimide leaves the oven in the form of a "bun" which has a crust over its outer surface which must be cut away in order to expose the interior cellular mass of cured polyimide foam. Unfortunately, blow holes, striations and other physical defects are often encountered in the buns, which means that the defective zones within the bun must be trimmed away and discarded, often with a considerable loss of raw materials and plant throughput. Complicating the problem has been the erratic nature of these events—only after the bun had been made and trimmed can it be determined whether the production run has been successful or not. Moreover, successive runs conducted under apparently the same conditions may give rise to vastly different results. In one case the yield of specification grade foam may be reasonably good, yet in the very next run it may be unacceptably low.

THE INVENTION

Provided by this invention are improvements in microwave-based foaming processes. In accordance with one embodiment of this invention prior to the application of the microwave radiation, the polyimide precursor is compressed to reduce the bulk volume of the precursor and heated so as to aid in the consolidation and enhance the compression of the precursor but not cause it to foam.

Other important objects and features and additional advantages of our invention will become apparent from the foregoing, from the appended claims, and as the ensuing detailed description and discussion proceeds in conjunction with the working examples in which that discussion and description is incorporated and the accompanying drawing in which:

Figure 1:
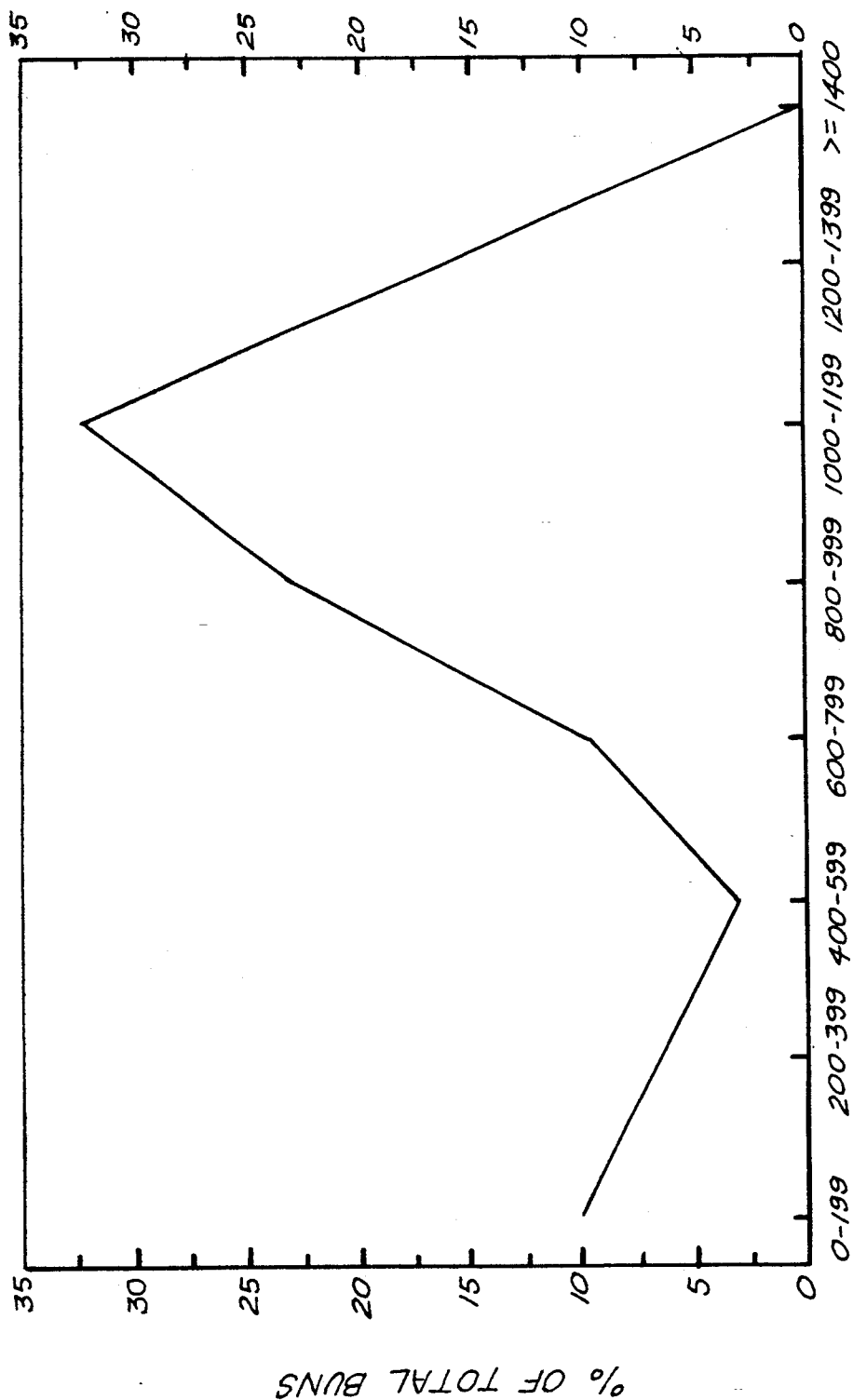
FIG. 1 shows the effect of heat on the yield of a polyimide in accordance with the principles of the present invention.

In one embodiment of the present invention, the polyimide precursor is first heated to a temperature below that at which any substantial foaming occurs. This "preheating" step can be effected prior to, during, or after the reduction in bulk volume described below. However, it is preferred that such heating (preheating) be carried out at the same time as the bulk volume reduction. It should be understood that preheating without the second compression step is also effective in advantageously improving the foam process of the polyimide precursor.

The heat applied to the polyimide precursor should raise the temperature of the material to the point below that at which any substantial foaming occurs. As such polyimide precursor temperatures in excess of 200° F. should be avoided. However, temperatures below about 80° F. are not effective in providing any substantial improvement in useable foam yields. In this temperature range, the polyimide precursor becomes to some extent consolidated, i.e., particles appears to become moldable and form a hardened, crusty mass. This results in better contact between such particles (they partially coalesce) decreasing the volume of voids and increasing the heat transfer and uniformity of heating with the body of the precursor. The result of such a heating step is to transform the free flowing powder into a more uniform, hardened, crusty material. Preferably, the range of temperatures to which the precursor is heated is about 90°-175° F., most preferably 140°-150° F.

The preheat should be applied for a time sufficient for the above discussed coalescense (as evidenced by the formation of a crusty hard mass) to become effective. Thus times from about 15 minutes to about 60 minutes are effective. Typically the higher the preheating temperature the shorter the required preheating time. For example, it is preferred to heat the precursor from 20 minutes at 120° F. or for 40 minutes at 90° F.

In the above embodiment of the present invention, the polyimide precursor powder is then compressed in order to reduce its bulk volume. By means of such compression, it is believed that the free void space in the powder is reduced which allows better heat transfer between the particles. While any reduction in bulk density is advantageous in creating a more uniform foam, it is more effective to reduce the bulk volume by at least about 25% to about 75% of that of the original bulk volume of the precursor powder. Preferably a reduction to about 50% of the original volume is effective in the foam development.

Since the polyimide precursor transfers heat very ineffectively, it is preferred to have one source of preheating located above the powder layer and another source located below such layer. As such, it is advantageous to have the precursor spread on a heated substrate such as a metallic substrate. A compression plate, also typically heated is preferably located on the top of the precursor composition. After compression and heating, the treated precursor composition still on the metallic substrate is positioned in a microwave-radiation emitting device for foaming.

The metallic substrate acts to curtail the microwave radiation impacting the precursor from the bottom of the composition.

While various microwave curtailing materials may be used, a metallic shield is preferable. Most preferable such a shield is composed of a metal or metallic alloy having a heat capacity similar to that of aluminum. In addition, such metal shield preferably does not conduct heat substantially more rapidly than aluminum.

Suitable metals include aluminum, aluminum-silicon alloys, ferroalloys, copper, titanium, stainless steel, gold, silver, and the like. Aluminum is particularly well suited for use as a shield since its heat capacity and thermal conductivity enable it to be preheated to the desired temperature within this range and be positioned in close proximity to the bottom of the bed, and thus suitably control the temperature of the precursor before and during the actual generation of the foamed mass.

The polyimide precursor, when in the form of a powder, is preferably placed on a heat stable cloth which in turn is positioned on the metallic shield. Preferably, the cloth is unsized. Among the materials from which such cloths may be fabricated are glass coated with a Teflon resin or other high temperature resin, glass cloth, ceramic cloth, fiberglass cloth, quartz cloth, and the like.

In the various embodiments of this invention described above, before and during the time the body of polyimide precursor is exposed to microwave radiation, the body of polyimide precursor and of the foam structure as it is developing therefrom are kept under a substantially vapor-impermeable microwave-compatible shroud that does not substantially restrict or impede development of the foam structure. For this purpose use may be made of a shroud composed of a polymer film, such as polyvinyl chloride (PVC), polyvinylidene chloride, polyethylene, polypropylene, nylon, polyethylene terephthalate or the like. The suitability of any given polymer film can readily be determined by simply running a few preliminary small scale foaming experiments using various candidate films to see which ones result in the formation of desirable foam structures during the microwaving step.

In practice suitably-sized sheets or strips of the film are placed over the top and around the sides and ends of the body of polyimide precursor before the microwave radiation is applied. The film should not be applied so that it excessively constricts the expansion of the developing film structure. Films having stretch characteristics are useful in this regard, provided of course that they are made of materials that can withstand the temperatures that are developed in the microwaving operation.

Another way of adapting the concept of the shroud to the microwaving operation is to maintain a suitable quantity of the precursor, encased in a sealed bag or pouch of substantially vapor-impermeable, microwave-compatible materials, such as a plastic bag or pouch, from around the time it is formed and to use the bag or pouch of precursor in the microwaving step. By this technique, the precursor and the developing foam are maintained under an atmosphere enriched in the vapors of the lower aliphatic alcohol liberated from the reaction of the precursor components. In this way all of the foregoing benefits of the shroud are achieved and additionally, handling, storage and transport of the precursor are facilitated.

Preferred precursors for use in the embodiments of the immediately preceding two paragraphs are comprised of a lower alkyl ($C_1$ to $C_{12}$ linear or branched alkyl) ester of an aromatic tetracarboxylic acid and at least one aromatic or heterocyclic primary diamine. It is also preferable to employ in those embodiments a precursor that is initially in powder form.

The polyimide precursors used in the practice of this invention can vary widely in composition. In general, they are composed of a mixture comprising at least (i) one or more organic tetracarboxylic acids or derivatives thereof, and (ii) one or more organic diamines co-reactive therewith, preferably an aromatic or heterocyclic or primary diamine. Components (i) and (ii) are usually present in the mixture in essentially stoichiometric quantities.

The organic tetracarboxylic acids or derivatives thereof are preferably based on aromatic tetracarboxylic acids having the general formula:

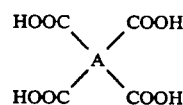

wherein A is a tetravalent organic group. The tetravalent organic group A is preferably one having one of the following structures:

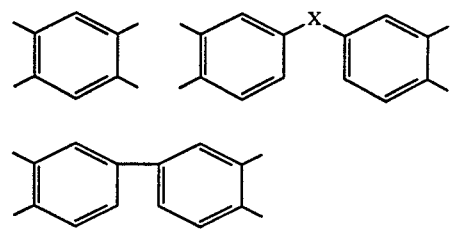

wherein X is one or more the following:

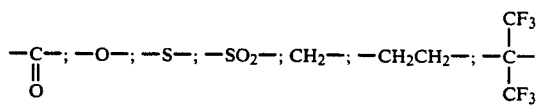

Preferred among the tetracarboxylic acid esters are the alkyl esters of 3,3',4,4'-benzophenone tetracarboxylic acid, most preferably the lower ($C_1$ to $C_6$) alkyl diesters thereof. Mixtures of two or more aromatic esters, most preferably predominating in diesters, may be employed, if desired.

It is also possible, in accordance with this invention, that the tetracarboxylic acid derivative employed in the manufacture of the polyimide foams be a caprolactam as taught by U.S. Pat. Nos. 4,161,477, 4,183,838 and 4,183,839, the disclosures of which are incorporated herein by reference. As described in those patents, bisimide is formed by reaction of a tetracarboxylic acid dianhydride with an oxoimine such as caprolactam and then reacted with the diamine or diamines to produce the desired polyimides. The caprolactam is displaced during the reaction, in much the same way as is the ester portion of the tetracarboxylic acid ester.

The tetracarboxylic acid derivative used in the manufacture of the initial polyimide foams employed in the practice of this invention may also be an N-substituted imido acid ester of the tetracarboxylic acid as taught by U.S. Pat. Nos. 4,647,597 and 4,656,198, the disclosures of which are incorporated herein by reference. As described in those patents, the N-substituted imido acid ester may be formed by reacting an aromatic tetracarboxylic acid dianhydride with an amino acid and an alcohol or mixture of alcohols. As further taught in those patents, on reaction of the imido acid ester with the diamine or diamines, the acid ester group bonded to the nitrogen atom of the N-substituted imido acid ester is displaced so that the desired polyimide is formed.

The organic diamines with which the foregoing mixture of tetracarboxylic acids or derivatives is employed may be represented by the formula:

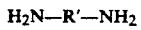

wherein R' is an aromatic group containing 5 to 16 carbon atoms which may contain up to one hetero atom in the ring, the hetero atom being nitrogen, oxygen or sulfur. The aromatic group may be further substituted with for example 1 to 4 $C_1$ to $C_6$ linear or branched alkyl groups. Also included are aromatic groups such as:

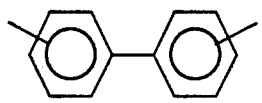

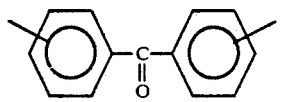

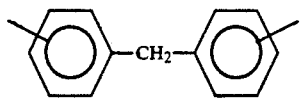

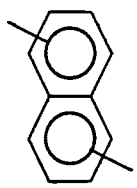

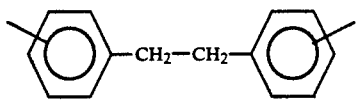

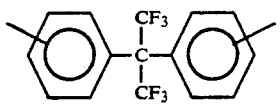

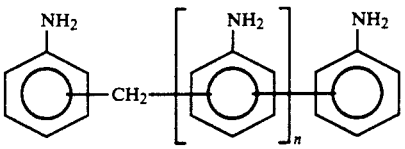

where n is an integer from 0 to 5

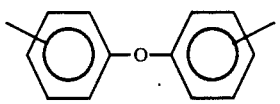

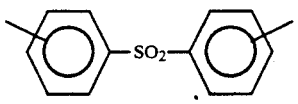

Representatives of such diamines include:
2,6-diaminopyrodine;
3,5-diaminopyridine;
3,3'-diaminodiphenylsulfone;
4,4'-diaminodiphenylsulfone;
4,4'-diaminodiphenylsulfide;
3,3'-diaminodiphenylether;
4,4'-diaminodiphenylether;
meta-phenylenediamine;
para-phenylenediamine;
4,4'-methylene dianiline;
2,6-diamino toluene;
2,4-diamino toluene;
2,6-diamino-3,5-diethyltoluene
2,4-diamino-3,5-diethyltoluene
and the like.

It is also possible and sometimes desirable in the preparation of the polyimide precursors, to include in the reaction mixture one or more aliphatic diamines. Such aliphatic diamines are preferably alpha-omega diaminoalkanes having the formula

     (I)

wherein n is an integer from 2 to 16. Representatives of such diamines include 1,3-diaminopropane, 1,4-diaminobutane, 1,5-diaminopentane, 1,6-diaminohexane, etc.

In place of or in addition to the foregoing aliphatic amines, use can be made of aliphatic esterified polyamines such as polyoxypropylene amines having the formula:

     (II)

wherein x varies from about 1 to about 5 carbon atoms.

Other useful primary diamines which may be included in the foams used in the practice of this invention include amino-terminated butadiene-nitrile copolymers having the general formula:

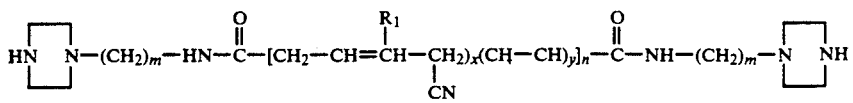

wherein R is a phenylene group or an alkylene group, $R_1$ is hydrogen or methyl, x and y are each independently integers ranging from 1 to 25 and m and n are integers, preferably below 20. In these copolymers it is preferred that butadiene constitute at least 50% by weight of the butadiene and nitrile monomer. The nitrile monomer copolymerized with the butadiene can either be acrylonitrile or methacrylonitrile. Such copolymers generally have low molecular weights, preferably less than 3,000 to insure that they are sufficiently fluid to react in the formation of the polyimide as well as sufficiently fluid so as to be capable of foaming.

Still another type of primary diamine which may be included in the polyimide foams used in this invention are the aromatic amino-terminated silicones, such as those having the general formula:

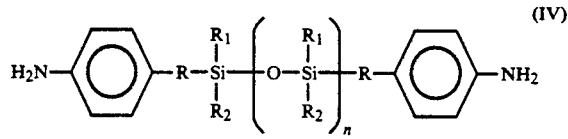

wherein R is a $C_2$ to $C_6$ alkylene group, $R_1$ and $R_2$ are each independently lower alkyl containing 1 to 3 carbon atoms and n is an integer from 1 to 4.

Another preferred category of diamines which may be utilized in forming the foams for use in this invention are the diesters of amino-substituted aromatic carboxylic acids and polymethylene glycols. Such diesters may be represented by the general formula:

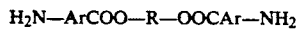

wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;
tetramethylene glycol-3-amino-4-nitrobenzoic acid diester;
tetramethylene glycol-3-amino-5-nitrobenzoic acid diester
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester; and the like. Mixtures of such diesters may be employed.

A particularly preferred diester of this type is the diester of trimethylene glycol (1,3-propanediol) and 4-aminobenzoic acid.

In producing the initial polyimide foams, the organic tetracarboxylic acid preferably in the form of its diester, most preferably from methanol or ethanol, is reacted with the above-referred-to amine(s) to form a prepolymer in the form of a consolidated, fragile foam structure, which is then subjected to additional heating in order to effect imide formation and thereby cure the polymer. When using the tetracarboxylic acid ester this operation can be conducted either in the presence or absence of an added blowing agent to provide the desired polyimide foam.

The relative proportions used in the preparation of the polyimides can be varied. In general, it is preferred to employ essentially stoichiometric proportions of tetracarboxylic acids or derivatives thereof and the primary diamine(s). However, non-stoichiometric mixtures can be used. As noted above, about 1 to about 40 mol percent (preferably about 10 to about 30 mol percent, most preferably about 20 mol percent) of the combination of tetracarboxylic acids or derivatives thereof employed is composed of one or more dicarboxycyclohexenyl succinic acids or their derivatives. The balance of the combination is preferably composed of one or more aromatic or heterocyclic diamines with or without the addition of still other diamines, for example diamines of the type referred to hereinabove in Formulas I, II, III, IV and V, or any mixture thereof. Usually the overall combination of amines will contain no more than about 10 mol percent of the diamines of Formulas I, II, III and IV. In the case of diamines of Formula V, these may comprise up to about 40 mol percent of the mixture of diamines used.

In accordance with one preferred form of the invention, use is made of a combination of aromatic amines, one of which is a nitrogen heterocyclic diamine, preferably 2,6-diaminopyridine and/or 3,5-diaminopyridine, while the other is a diamine containing two benzene rings, preferably 4,4'-methylenedianiline and/or 4,4'oxydianiline. When using a combination of aromatic amines in accordance with this concept, the mol ratio of the non-heterocyclic diamine to the nitrogen-containing heterocyclic diamine is within the range of 1.0 to 3.0, and preferably 1.5 to 2.8.

When using a lower alkyl ester of the tetracarboxylic acid, the resulting alcohol produced from the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen OT, Celogen AZ 130, Celogen RA, Celogen HT 500, Celogen HT 500, sodium bicarbonate, benzenesulfonyl hydrazide, boric acid, benzoic acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle sizes being less than 150 microns in diameter.

The chemical compositions of the blowing agents identified by trade name above follow:

| Blowing Agent | Chemical Composition |
| --- | --- |
| | boric acid |
| Celogen TSH | toluenesulfonyl hydrazide |
| Celogen OT | p,p'-oxybis(benzenesulfonyl hydrazide) |
| Celogen AZ 130 | azodicarbonamide |
| Celogen RA | p-toluenesulfonyl semicarbazide |

-continued

| Blowing Agent | Chemical Composition |
|---|---|
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD values. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in the process.

In the practice of this invention, it is possible to include in the reaction mixture various filler and/or reinforcing materials. For example, graphite, glass and other synthetic fibers can be added to the composition to produce a fiber-reinforced product. Microballoons may be added for density adjustment, if desired. It is frequently desirable to employ a surfactant thereby increasing cellular structure stability and uniformity, and increase fatigue resistance and make the foam more flexible and resilient. The nature of such surfactants for this use is well known and reported in the patent literature.

Surfactants may also be included in these compositions. These surfactants include the polyoxyethylene ethers such as polyoxyethylene ether fatty esters, polyoxyethylene ether fatty alcohols and polyoxyethylene ether fatty ethers and the silicone glycols.

Although not necessary, for some applications it is desirable to add a suitable quantity of a flame retardant material to the formulation in order to still further increase the flame resistance of the resultant foam.

In preparing the precursors of this invention, it is preferred to employ the procedures and spray drying techniques described in U.S. Pat. No. 4,296,208, the disclosure of which is incorporated herein by reference.

The temperatures at which the precursor is converted to the polyimide foam are generally those temperatures used in the preparation of other polyimide polymers. As a general rule temperatures ranging from 200° to 400° C. can be used, with heating times from 5 to 60 minutes or longer. As those skilled in the art will appreciate, the time for carrying out the reaction is somewhat dependent upon the reaction temperature, higher temperatures enabling the use of shorter reaction times. It is also possible to heat to a lower temperature in the first stage of the reaction and then to higher temperatures in the later stages.

Heating can be carried out in a conventional oven if desired. Alternatively, the foaming and curing of the precursor into a foamed polyimide polymer can be effected by means of microwave heating. In this technique, the precursor is exposed for 1 to 120 minutes to radio frequencies within the range of 915 to 2450 mHz, with the power output ranging from 1 to 100 kw. The power output to prepolymer weight ratio generally falls within the range of 0.1 to 10 kw per kg.

Having described the basic concepts of the invention, reference is now made to the following example which is provided by way of illustration, but not by way of limitation of the practice of the invention.

EXAMPLES

To a 1.0 liter three-neck, round-bottom glass flask, equipped with a mechanical stirrer, thermometer, heating jacket, and condenser, is added 320 mL (8.0 moles) methyl alcohol, and 24 mL (1.33 moles) distilled water. The solution is thoroughly mixed and 322.23 g (1.0 mole) benzophenone tetracarboxylic acid dianhydride (BTDA) are added with stirring. This mixture is then heated to reflux to form the methyl ester of the BTDA. Once the esterification reaction is complete, the clear solution is cooled to below 40° C. and 158.6 g (0.8 mole) of methylenedianiline (MDA) are added. After the MDA has completely dissolved, 21.8 g (0.2 mole) of 2,6-diaminopyridine (DAP) are added and mixed until dissolved. This is followed by the addition of 14.0 grams (3.0 percent by weight of the polyimide solids) of a silicone glycol surfactant, Dow Corning 193. The solution is thoroughly mixed to yield a liquid polyimide resin.

The liquid resin is processed into powder using a spray dryer or a vacuum dryer.

EXAMPLE II

A larger commercial batch process was carried out using 808 lbs of methanol, 57 lbs of water (deionized) admixed with 750 lbs of BTDA. After esterification, 330 lbs of MDA was added to the cooled solution and, when dissolved, 77 lbs of DAP then added. Mixture of the solution with 22 lbs of Dow Corning 193 surfactant gave a yellow liquid that, after spray drying to remove water and alcohol produced the polyimide precursor.

The dry solid precursor (140 lbs) was placed on an aluminum sheet ¼" thick preheated to a temperature of 175° F. The powder was spread on the sheet to a layer of about 4" thick. An upper powder platten preheater (hydraulically actuated) assumbly was positioned over the bed of powder. The powder was allowed to heat under pressure from the patten until the powder had reached about 150° F. and been reduced in volume by 50%, i.e., the bed became about 2" thick.

The preheated and compressed hardened (crusty) mass was then placed in a microwave cavity of a 30 Kw Gerling Laboratories Batch Cavity microwave oven and exposed to microwave radiation at frequencies between 915 and 2450 mHz to foam the material by the free rise technique. Curing was typically completed in a thermal circulating air oven. Both techniques are well known in the prior art. See, for example, U.S. Pat. No. 4,305,786 incorporated herein by reference.

The yield of usable product was then determined from multiple runs of polyimide foam production. FIG. 1 shows that maximum yields obtained by the improved process of the present invention were about 1000 board feet of foam from about 35% of the raw buns produced.

Figure 2:
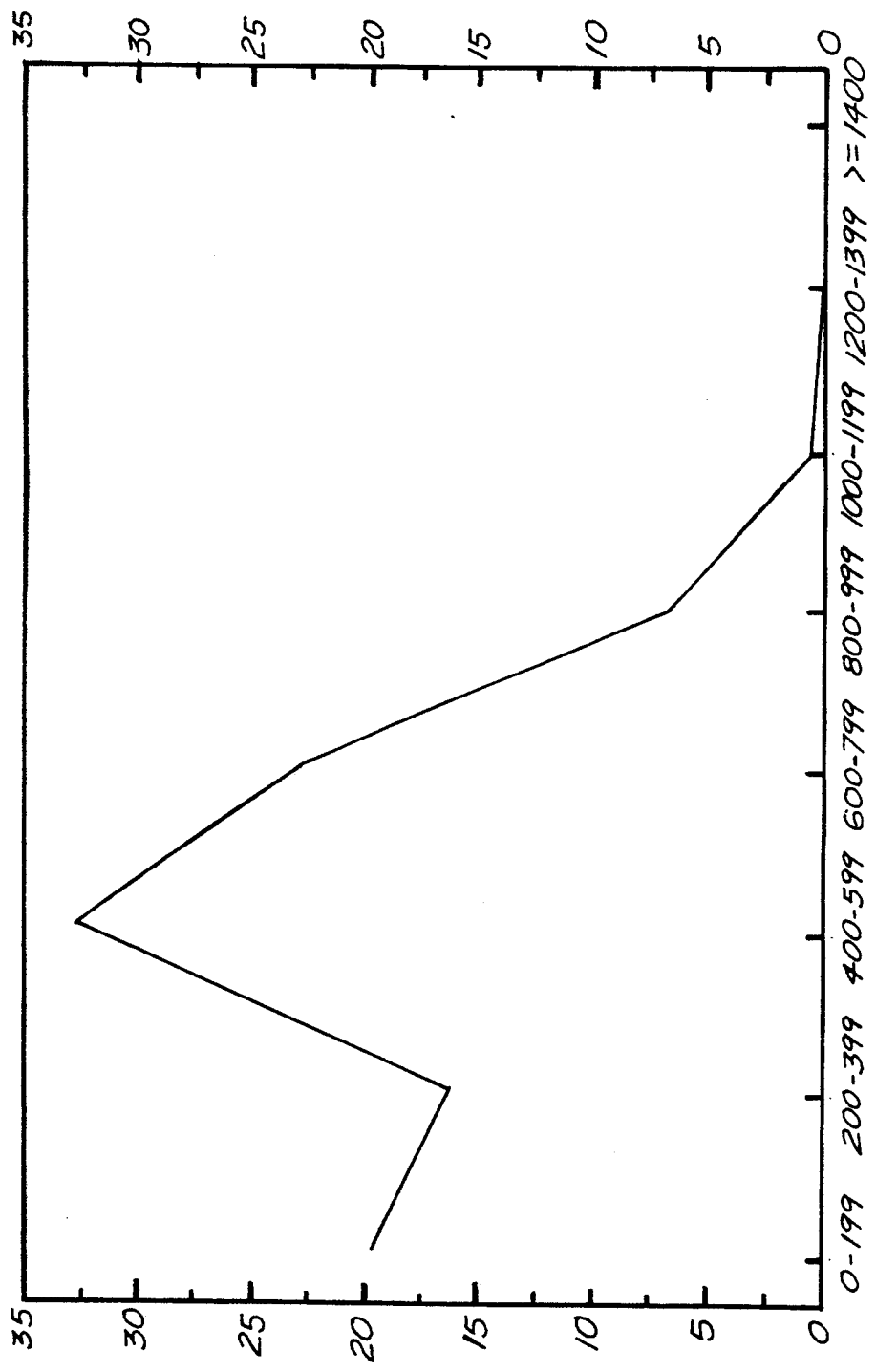
FIG. 2 shows the effect of not preheating the polyimide precursor on yields of polyimide foam.

As a comparative example, other buns were made not using the preheating and/or compression step as set forth in the present invention. FIG. 2 illustrates the dramatic decrease in yields without such improvement.

The foregoing disclosure has been presented for purposes of illustration and not limitation. As can readily be appreciated by those skilled in the art, this invention is susceptible to considerable variation in its practice within the spirit and scope of the ensuing claims.

We claim:

1. A method for producing a foamed polymer structure in which a polyimide precursor is exposed to microwave radiation of intensity sufficient to cause the development of a foamed polymer structure by the generation of gaseous materials within the body of the precursor, the improvement comprising prior to exposing said precursor to microwave radiation compressing and heating the polyimide precursor at a temperature and pressure sufficient to cause said precursor to consolidate and form a hardened mass but not to develop into a foam through generation of gaseous materials.

2. The improvement in accordance with claim 1 wherein said precursor is compressed and heated between a microwave radiation-curtailing shield positioned below said precursor and a compression plate positioned above said precursor.

3. The improvement in accordance with claim 1 wherein said compressing reduces the bulk volume of the polyimide precursor by about 25% to about 75% of its original volume.

4. The improvement in accordance with claim 3 wherein said precursor is initially in the form of a powder.

5. The improvement in accordance with claim 1 wherein said precursor is comprised of a lower alkyl ester of an aromatic tetracarboxylic acid and at least one aromatic or heterocyclic primary diamine.

6. The improvement in accordance with claim 5 wherein said ester is composed predominantly of di-lower alkyl ester of benzophenone tetracarboxylic acid.

7. The improvement in accordance with claim 5 wherein said diamine is composed predominantly of 2,6-diaminopyridine, 4,4'-methylenedianiline or 4,4'-oxydianiline, or mixtures thereof.

8. The improvement in accordance with claim 5 wherein said ester is composed predominantly of di-lower alkyl ester of benzophenone tetracarboxylic acid and wherein said diamine is composed predominantly of 2,6-diaminopyridine, 4,4'-methylenedianiline or 4,4'-oxydianiline, or mixtures thereof.

9. The improvement in accordance with claim 1 wherein a substantially vapor-impermeable microwave compatible shroud is positioned between the compressor plate and the polyimide precursor.

10. The improvement in accordance with claim 9 wherein said shroud is a polymer film.

11. The improvement in accordance with claim 10 wherein said polymer film is polyvinyl chloride film.

12. The improvement in accordance with claim 9 wherein
(a) the precursor is initially in the form of a powder comprised of a lower alkyl ester of an aromatic tetracarboxylic acid and at least one aromatic or heterocyclic primary diamine;
(b) the shield is a metallic shield; and
(c) the shroud is a polymer film.

13. The improvement in accordance with claim 12 wherein the shield is composed primarily or exclusively of aluminum, and the shroud is composed of polyvinyl chloride film.

14. The improvement in accordance with claim 1 wherein the developed foam structure is cured into a polyimide foam.

15. The improvement in accordance with claim 1 wherein the developed foam structure is subjected to curing into a polyimide foam in a thermal oven.

16. The improvement in accordance with claim 9 wherein the developed foam structure is cured into a polyimide foam.

17. The improvement in accordance with claim 9 wherein the developed foam structure is subjected to curing into a polyimide foam in a thermal oven.

18. A method of producing a foamed polymer structure which comprises:
(i) heating a polyimide precursor to a temperature in the range of about 80° to about 200° F., and compressing said precursor to reduce its bulk volume by about 25% to about 75% of the original volume,
(ii) subjecting the body of polyimide precursor to microwave radiation of intensity sufficient to cause the development of a foamed polymer structure by generation and evolution of gaseous materials within the body of the precursor, and
(iii) maintaining the body of polyimide precursor and of the foam structure as it is developing therefrom under a substantially vapor-impermeable microwave-compatible shroud that does not substantially restrict or impede development of the foam structure.

19. A method of claim 18 wherein said temperature is in the range of about 90° to about 175° F.

20. A method of claim 18 wherein the precursor is initially in the form of a powder comprised of a lower alkyl ester of an aromatic tetracarboxylic acid and at least one aromatic or heterocyclic primary diamine.

21. A method of claim 18 wherein said temperature is in the range of about 80° to about 100° F., wherein said ester is composed predominantly of di-lower alkyl ester of benzophenone tetracarboxylic acid and wherein said diamine is composed predominantly of 4,4'-methylenedianiline or 4,4'-oxydianiline, or both.

22. A method of claim 18 wherein the developed foam structure is cured into a polyimide foam.

23. A method of claim 18 wherein the developed foam structure is subjected to curing into a polyimide foam in a thermal oven.

24. A method of producing a foamed polymer structure which comprises:
(i) raising the temperature of a body of polyimide precursor to a suitable temperature in the range of about 80° to about 200° C., while compressing the polyimide precursor to reduce its bulk volume from about 25% to about 75% of the original bulk volume,
(ii) while the precursor is at said temperature, commencing the exposure of the body of polyimide precursor to microwave radiation of intensity sufficient to cause the development of a foamed polymer structure by generation and evolution of gaseous material within the body of the precursor, and
(iii) concurrently maintaining the precursor and the foam structure developing therefrom under an atmosphere enriched in vapors of a lower alcohol.

25. A method of claim 24 wherein said temperature is in the range of about 90° to about 175° F.

26. A method of claim 24 wherein the precursor is initially in the form of a powder comprised of a lower alkyl ester of an aromatic tetracarboxylic acid and at least one aromatic or heterocyclic primary diamine.

27. A method of claim 26 wherein said temperature is in the range of about 90° to about 175° F., wherein said ester is composed predominantly of di-lower alkyl ester of benzophenone tetracarboxylic acid and wherein said diamine is composed predominantly of 4,4-methylenedianiline or 4,4'-oxydianiline, or both.

28. A method of claim 24 wherein the developed foam structure is cured into a polyimide foam.

29. A method of claim 24 wherein the developed foam structure is subjected to curing into a polyimide foam in a thermal oven.

* * * * *